US011834064B2

(12) United States Patent
Tournabien et al.

(10) Patent No.: US 11,834,064 B2
(45) Date of Patent: *Dec. 5, 2023

(54) METHOD AND SYSTEM FOR DETECTING NON-VISIBLE VEHICLES

(71) Applicant: APTIV TECHNOLOGIES LIMITED, St. Michael (BB)

(72) Inventors: Guillaume Tournabien, Saint Soupplets (FR); Cyril Roumier, Asnieres sur Seine (FR)

(73) Assignee: Aptiv Technologies Limited, St. Michael (BB)

(*) Notice: Subject to any disclaimer, the term of this patent is extended or adjusted under 35 U.S.C. 154(b) by 0 days.

This patent is subject to a terminal disclaimer.

(21) Appl. No.: 17/857,240

(22) Filed: Jul. 5, 2022

(65) Prior Publication Data
US 2022/0332341 A1    Oct. 20, 2022

Related U.S. Application Data

(63) Continuation of application No. 16/865,930, filed on May 4, 2020, now Pat. No. 11,377,116.

(30) Foreign Application Priority Data

May 31, 2019  (EP) .................................. 19177749

(51) Int. Cl.
*B60W 50/14*    (2020.01)
*B60W 30/08*    (2012.01)
(52) U.S. Cl.
CPC ............ *B60W 50/14* (2013.01); *B60W 30/08* (2013.01); *B60W 2420/40* (2013.01);
(Continued)

(58) Field of Classification Search
None
See application file for complete search history.

(56) References Cited

U.S. PATENT DOCUMENTS 10,407,059 B2 * 9/2019 Sham ...................... G01S 19/42
10,420,958 B2 * 9/2019 Kauppinen .......... A61N 5/1036
(Continued)

FOREIGN PATENT DOCUMENTS

CN    106199614 A    12/2016
CN    108007452 A    5/2018
(Continued)

OTHER PUBLICATIONS

Extended European Search Report for Application No. EP 19 17 7749 dated Nov. 29, 2019.

*Primary Examiner* — Fekadeselassie Girma
(74) *Attorney, Agent, or Firm* — Harness, Dickey & Pierce, P.L.C.

(57) ABSTRACT

A method for detecting non-visible vehicles in a vehicle's environment includes screening, by a receiver of a proximity sensor, any incoming proximity signal capable of propagating through the air along a non-linear path. Receiving such an incoming proximity signal and processing the received proximity signal allows for detecting an object that is otherwise not visible to a driver or another type of sensor on a vehicle and warning the driver or an advanced driver-assistance system about the detected object.

14 Claims, 4 Drawing Sheets

(52) U.S. Cl.
CPC ..... *B60W 2420/54* (2013.01); *B60W 2420/60* (2013.01); *B60W 2554/4042* (2020.02); *B60W 2554/80* (2020.02)

(56) References Cited

U.S. PATENT DOCUMENTS

| | | | | |
|---|---|---|---|---|
| 10,479,354 | B2* | 11/2019 | Posselius | E02F 9/24 |
| 10,698,222 | B1* | 6/2020 | Kim | G06V 10/82 |
| 10,732,268 | B1* | 8/2020 | Diehl | G01S 17/87 |
| 10,780,879 | B2* | 9/2020 | Izumi | B62D 15/0285 |
| 11,377,116 | B2* | 7/2022 | Tournabien | G01S 1/72 |
| 2006/0164221 | A1* | 7/2006 | Jensen | B60Q 1/535 |
| | | | | 340/464 |
| 2011/0094986 | A1* | 4/2011 | Lee | B60R 9/06 |
| | | | | 211/183 |
| 2012/0090395 | A1* | 4/2012 | Lavoie | G01S 7/52006 |
| | | | | 73/620 |
| 2014/0288814 | A1* | 9/2014 | Schoenherr | G01S 15/931 |
| | | | | 701/301 |
| 2016/0061942 | A1* | 3/2016 | Rao | G01S 13/583 |
| | | | | 342/195 |
| 2016/0117927 | A1* | 4/2016 | Stefan | H04W 84/18 |
| | | | | 340/932.2 |
| 2017/0144654 | A1* | 5/2017 | Sham | B60W 30/06 |
| 2017/0287233 | A1* | 10/2017 | Nix | G08G 1/166 |
| 2018/0001930 | A1* | 1/2018 | Sham | G01S 15/86 |
| 2019/0016332 | A1* | 1/2019 | Shin | G01S 7/52003 |
| 2020/0097014 | A1* | 3/2020 | Wang | G06Q 10/047 |
| 2020/0133745 | A1* | 4/2020 | Dugan | H04W 4/021 |
| 2020/0160463 | A1* | 5/2020 | He | B25J 11/00 |
| 2020/0200855 | A1* | 6/2020 | Newman | G08G 1/163 |
| 2020/0201347 | A1* | 6/2020 | Dalfra | G05D 1/027 |
| 2020/0269877 | A1* | 8/2020 | Mortazavi | G08G 1/0116 |
| 2020/0290638 | A1* | 9/2020 | Damnjanovic | G06F 18/2113 |
| 2021/0001874 | A1* | 1/2021 | Wang | H04W 4/44 |
| 2021/0001893 | A1* | 1/2021 | Etcheverry | B60W 30/12 |
| 2021/0155244 | A1* | 5/2021 | Fowe | G08G 1/167 |
| 2023/0080993 | A1* | 3/2023 | Kim | B60W 50/10 |
| | | | | 701/23 |
| 2023/0083255 | A1* | 3/2023 | Ebrahimi | G06N 3/04 |
| | | | | 701/31.6 |

FOREIGN PATENT DOCUMENTS

| | | |
|---|---|---|
| CN | 109799831 A | 5/2019 |
| DE | 102016201067 A | 7/2017 |
| DE | 102018119263 B3 | 12/2019 |
| EP | 3477616 A1 | 5/2019 |
| KR | 20110094986 A | 8/2011 |

\* cited by examiner

METHOD AND SYSTEM FOR DETECTING NON-VISIBLE VEHICLES

CROSS REFERENCE TO RELATED APPLICATION

This application is a continuation of U.S. patent application Ser. No. 16/865,930, filed on May 4, 2020, which claims priority to European Patent Application No. 19177749.9, filed on May 31, 2019.

FIELD OF THE DISCLOSURE

The present disclosure generally relates to systems and methods of operating partially and fully-automated or autonomous vehicles.

Such a method is useful especially in the field of human-assisted or autonomous vehicles using sensors for obstacle detection and avoidance, to navigate safely through its environment.

BACKGROUND OF THE DISCLOSURE

Partially and fully-automated or autonomous vehicles have been proposed.

The document US2016/0231746 discloses systems and methods for operating an automated vehicle such as an autonomous vehicle including an autonomous guidance system, a method of automatically controlling an autonomous vehicle based on electronic messages from roadside infrastructure or other-vehicles, a method of automatically controlling an autonomous vehicle based on cellular telephone location information, pulsed LED vehicle-to-vehicle (V2V) communication system, a method and apparatus for controlling an autonomous vehicle, an autonomous vehicle with unobtrusive sensors, and adaptive cruise control integrated with a lane keeping assist system. The systems and methods may use information from radar, LIDAR, a camera or vision/image devices, ultrasonic sensors, and digital map data to determine a route or roadway position and provide for steering, braking, and acceleration control of a host vehicle.

However, the systems and methods necessary to control the vehicle can be improved.

In particular, in certain specific driving situations, such as crossroads or work area where road work fences are installed, usual sensors like radar and camera cannot detect non-visible vehicles moving in the vehicle's environment and may be towards the vehicle. More generally, non-visible vehicles are caused by obstacles between the sensing vehicle concerned and the non-visible vehicle, such as a parked car, a wall, metal plates, road work fences or any other object obstructing the view between the two vehicles.

Risks of collision increase if an automated vehicle is not able to detect another (non-visible) vehicle on a crossroad or in a work area, reducing the safety of Advanced Driver Assistance System (ADAS) or autonomous driving vehicle.

SUMMARY

A first aspect of the disclosure relates to a method for detecting non-visible vehicles in a driven vehicle's environment, wherein each vehicle is equipped with at least one proximity sensor. The method includes: screening, by a receiver of the proximity sensor, any incoming proximity signal capable of propagating through the air along a non-linear path; receiving an incoming proximity signal coming from a non-visible vehicle; processing the received proximity signal to detect the non-visible vehicle; and warning a driver and/or an advanced driver-assistance system about the detected non-visible vehicle.

By using proximity sensors screening and receiving proximity signals propagating in the air along a non-linear path, it allows an equipped vehicle to receive these proximity signals despite the presence of some obstacles in between the driven vehicle and another vehicle non-visible either for the driver or for the cameras and radar detectors of the driven vehicle. These proximity signals are capable of propagating through the air along a non-linear path contrary to a light wave coming from any light sensor. It therefore allows detection of non-visible vehicles located behind an obstacle and in turn warning the driver or the Advanced Driver Assistance System (ADAS) in order to prevent a risk of collision between both vehicles.

Advantageously, the method comprises for each driven vehicle a preliminary step of: emitting, by an emitter of the proximity sensor, a proximity signal capable of propagating through the air along a non-linear path.

In this manner, all equipped driven vehicles are able to be detected by other equipped non-visible driven vehicles. A non-linear path is one without reflective surfaces so that a light beam would not be able to reach non-visible vehicles from the driven vehicle.

The emitted proximity signal in some embodiments is a periodic pulse, such as a proximity signal emitted every 100 ms.

Using a periodic pulse reduces the power consumption of the proximity sensor compared to a continuous signal. A frequency of 10 Hz is high enough to allow rapid detection of a non-visible vehicle and to prevent a risk of collision.

The at least one proximity sensor in some embodiments is an ultrasonic sensor, the proximity signal is an ultrasonic signal and the screening step is a listening step. There may be a plurality of ultrasonic sensors which are the parking sensors of the vehicle. The ultrasonic signal can be a periodic pulse emitted with maximum power of the parking sensor.

The use of ultrasounds prevents any disturbance to the driver and in general to road users. When driving, parking sensors are not used and are therefore available for other purposes such as being used as proximity sensors to detect (non-visible) vehicles in the surroundings. In order to benefit from the maximum range to detect non-visible vehicle, the ultrasonic signal is emitted with maximum power. Further, the use of ultrasounds does not affect the efficiency of the detection whatever the weather conditions are.

Using the parking sensors of existing park assist option enables to implement the method on the existing automotive fleet of vehicles equipped with such ultrasonic park assist. Usually, the ultrasonic park assist uses the same frequency, namely 40 KHz, so that other equipped vehicles can detect the emitted pulse. Compared to the standard usage of the ultrasonic park assist, the present method increases (doubles) the detection distance because one equipped vehicle emits the pulse and another receives it.

Advantageously, the processing step of the received ultrasonic signals further analyses the Doppler effect to determine the distance and speed of the detected non-visible vehicle.

By analyzing the Doppler effect of the incoming ultrasonic signals, the processor can retrieve a variable period of the emitted pulses with will depend on the distance of the emitter of the non-visible vehicle as well as its speed.

The ultrasonic signals can be modulated in amplitude and the processing step further analyses the amplitude modulation to determine any speed variation of the detected non-visible vehicle.

Modulation of the amplitude of the ultrasonic signal allows to the processor to determine if any speed variation of the detected non-visible vehicle.

The warning step in some embodiments further evaluates and warns about a risk of collision with the detected non-visible vehicle.

Depending on the distance and speed of the detected non-visible vehicle the warning unit may adapt the warning signal sent to the driver and/or the ADAS. In case of amplitude modulation of the incoming signals, the processor also detects the variation of the speed and the warning unit may further adapt the warning signal.

The receiver may screen any incoming proximity signal either continuously or when the emitter is not emitting.

To avoid interference between the receiver(s) and the emitter(s) of the proximity sensor(s) of an equipped vehicle, the receiver is inactive during emission of the proximity signal.

In some embodiments, each vehicle is equipped with at least one light sensor and the method includes: detecting visible vehicles in the vehicle's environment by the at least one light sensor; comparing all detected vehicles by both the light sensor and the proximity sensor; and determining the detected vehicles by the proximity sensor which are not detected by the light sensor as non-visible vehicles.

By comparing the vehicles detected on the one hand by the light sensors, such as a Lidar or camera, and on the other hand by the proximity sensors, it allows to easily distinguish the vehicles which are not visible since they are not detected by the light sensors but only by the proximity sensors.

A second aspect of the disclosure relates to an advanced driver assistance system of a vehicle for detecting non-visible vehicles in the vehicle's environment, for implementing the method according to the first aspect, the system comprising at least one proximity sensor comprising an emitter for emitting a proximity signal capable of propagating through the air along a non-linear path; a receiver in a screening mode to screen and receive any incoming proximity signal; a processor for processing the received proximity signal to detect a non-visible vehicle; and a warning unit for warning a driver and/or the advanced driver-assistance system of the detected non-visible vehicle.

The proximity sensor in some embodiments is an ultrasonic sensor, such as a parking sensor. The system may include a plurality of proximity sensors arranged at the front, rear and sides of the vehicle.

A third aspect of the disclosure relates to a vehicle equipped with an advanced driver assistance system according to the second aspect.

BRIEF DESCRIPTION OF THE DRAWINGS

Other features and advantages of the present disclosure will appear more clearly from the following detailed description of particular non-limitative examples of the disclosure, illustrated by the appended drawings where.

DETAILED DESCRIPTION

Before describing in more details one preferred method and system according the present disclosure, one will understand that the present disclosure is perfectly transposable to other specific applications with a need to detect non-visible objects in a crowded environment.

Figure 1A:
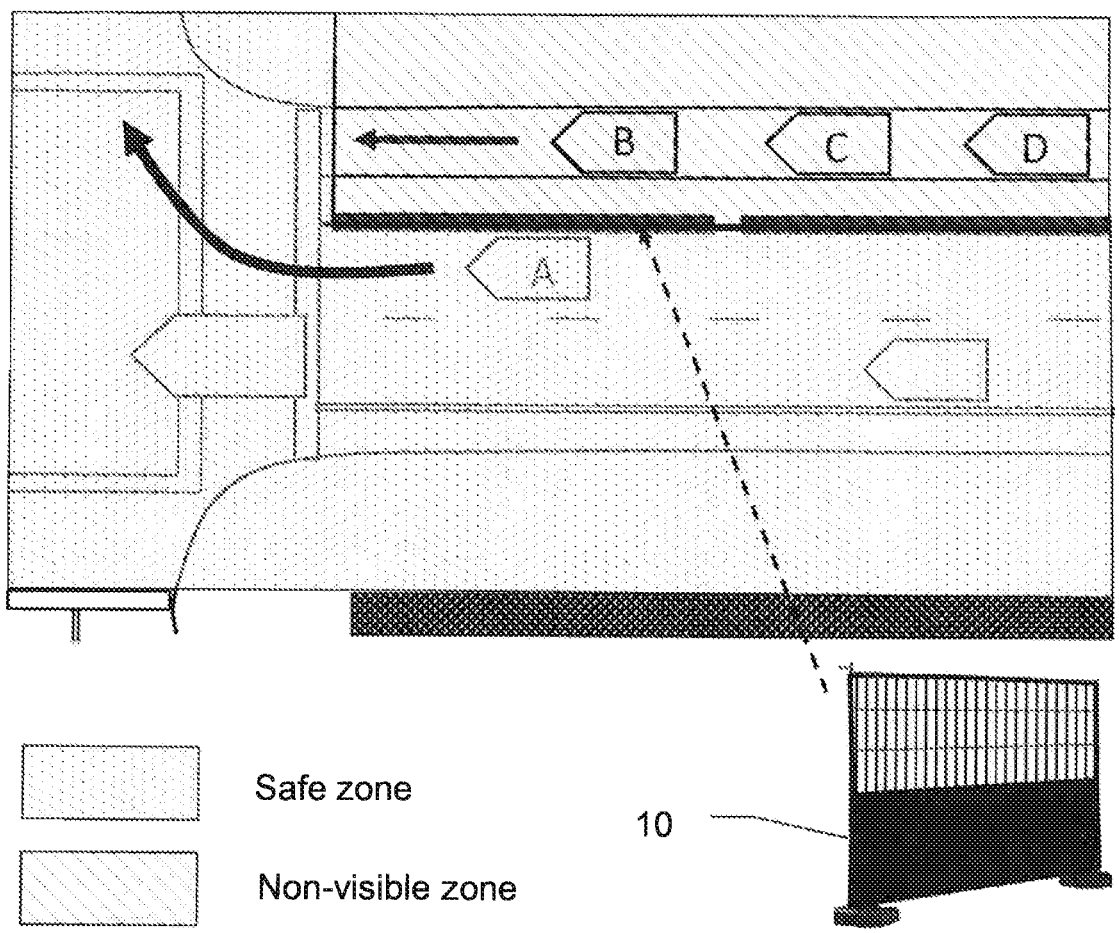
FIG. 1A represents a driving scene according to a current situation.

FIG. 1A represents a driving scene according to the current situation.

A vehicle (A) moves on the main tracks of the roadway along a work zone delimited by road work fences (10) regularly placed along the tracks. On the other side of the fences, there is a hidden lane for the vehicle (A) on which vehicles (B, C and D) are driving.

The vehicle (A) is arriving at a crossroad and intends to turn right. At the same time, vehicle (B) is driving forward without being seen by the vehicle (A). It results in a risk of collision between the vehicles (A) and (B).

Such driving scene would not be safer if vehicles (A) and (B) were equipped with usual sensors like radar and camera as such devices would not be able to detect vehicles through obstacles such as for instance work road fences or a parked vehicle. The delimitation of the risks are represented by two zones:

a "safe" zone represented by the region covered by a cloud of points;

a "non-visible" zone or "danger" zone represented by the hashed region.

Figure 1B:
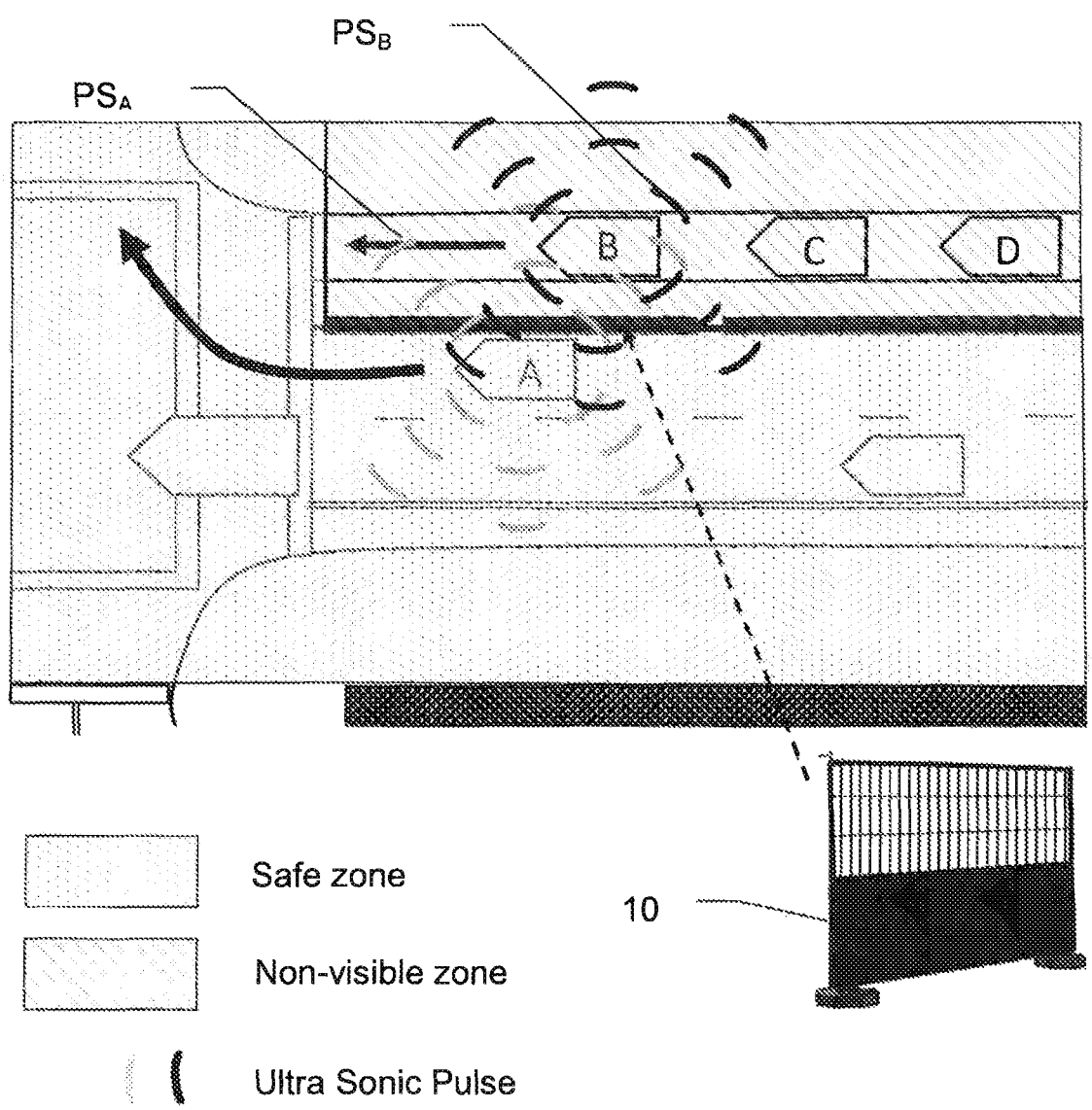
FIG. 1B represents a similar driving scene as FIG. 1A implementing the method for detecting non-visible vehicles.

FIG. 1B represents a similar driving scene as FIG. 1A implementing a method to detect vehicles in the non-visible zone.

In the same manner, the vehicle (A) moves on the main track of the roadway along a work zone delimited by road work fences (10) regularly placed along the track. On the other side of the fences, there is a hidden lane for the vehicle (A) on which vehicles (B, C and D) are driving. The vehicle (A) is arriving at a crossroad and intends to turn right. At the same time, vehicle (B) is driving forward without being seen by the vehicle (A). It results in a risk of collision between the vehicles (A) and (B) where the safe zone and non-visible zone are the same.

However, in the driving scene of FIG. 1B, both vehicles (A) and (B) are equipped with at least one proximity sensor. Both vehicles are preferably by a plurality of ultrasonic sensors of the parking sensors. More preferably the vehicles can also be equipped with such sensors on their sides so as to be able to emit and receive signal from everywhere.

The emitters of the proximity sensors of the vehicle (A) emit a proximity signal (PSA) and the emitters of the proximity sensor of the vehicle (B) emit a proximity signal (PSB). In the case of a plurality of sensors arranged on the front, the rear and preferably the sides of the vehicle, the proximity signals (PSA, PSB) are uniformly propagated around the vehicles (A, B). The proximity signals are preferably ultrasonic pulses periodically emitted.

The receivers of the proximity sensors of the vehicle (A) receive the incoming proximity signal (PSB) from vehicle (B) while the receivers of the proximity sensors of the vehicle (B) receive the incoming proximity signal (PSA) from vehicle (A).

The received signals by each vehicle (A, respectively B) is then processed to be able to detect a non-visible vehicle (B, respectively A) which is in the vehicle's environment (A, respectively B).

Although, it is not represented on FIG. 1B, the other non-visible vehicles (C, D) may also be equipped with proximity sensors emitting proximity signals ($PS_C$, $PS_D$) and be detected by the vehicle (A).

The detection of non-visible vehicles (e.g. B, C, D) may be done for instance by analyzing the Doppler effect of the received proximity signals to determine the distance and speed of these vehicles.

In other words, the emitter of the vehicle (B) emits ultrasonic pulses, whose wave front is spherical. The receiver of the vehicle (A) receives the wave with a delay, due to its propagation. Between two pulses, the vehicle (B) has moved with respect to the vehicle (A), and as a result, the spherical wave front does not have the same center. As a result when approaching the crossroad, as the emitter, i.e. vehicle (B), approaches the receiver, i.e. vehicle (A), the waves arrive at a faster rate than the emission so that the period of the received pulses seems shorter, and therefore the frequency higher. On the other hand, when the emitter moves away from the receiver, the period seems longer, and therefore the frequency smaller. A similar phenomenon occurs when the receiver moves relative to the emitter, or when both move.

Further by using ultrasonic pulses modulated in amplitude as proximity signals, the proximity signals may be further processed to determine any speed variation of the detected non-visible vehicles (e.g. B, C, D). Based on the detected and processed proximity signals, the vehicle is able to evaluate a risk of collision with any detected non-visible vehicle.

Then the vehicle (A) may warn the driver and/or an advanced driver-assistance system of vehicle (A) about the detected non-visible vehicle, i.e. vehicle (B). And the vehicle (B) may warn the driver and/or an advanced driver-assistance system of vehicle (B) about the detected non-visible vehicle, i.e. vehicle (A). Such warning reduces the risk of collision between both vehicles (A, B).

Figure 2:
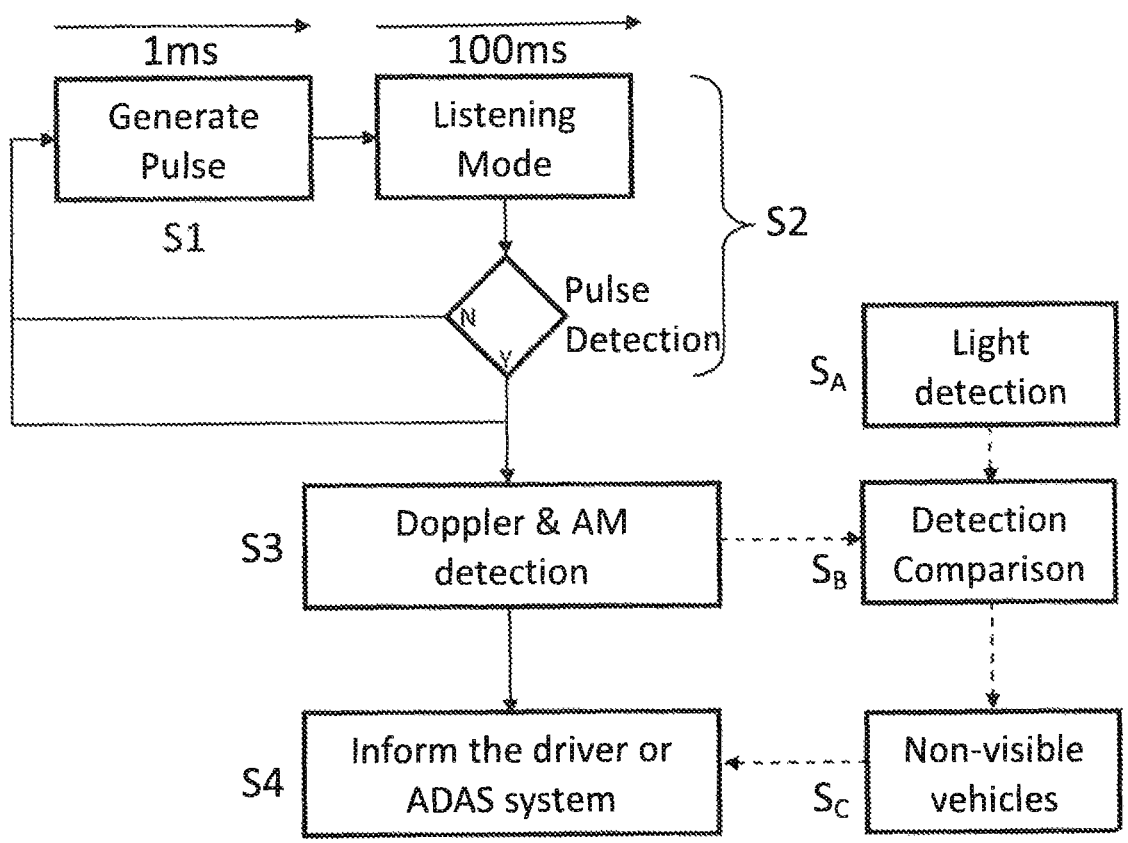
FIG. 2 represents a flowchart of the method for detecting non-visible vehicles.

FIG. 2 represents a flowchart of the method for detecting non-visible vehicles.

During a first step S1, the emitter of the proximity sensor emits a proximity signal. Preferably, the emitter generates a periodic pulse. The generated pulse has preferably a duration of 1 ms (millisecond) so as to reduce as far as possible the power consumption of the proximity sensor. The period between two pulses is 100 ms, i.e. 10 Hz frequency, which is a right compromise between power consumption and safe detection of non-visible vehicles.

During a second step S2, the receiver of the proximity sensor is active in a "screening mode" (or "listening mode" for ultrasonic signals) to be able to detect any incoming proximity signal in the surroundings. The receiver is preferably switched on and become active only when the emitter is not generating a pulse. The listening mode is preferably active for 100 ms between two generated pulses by the emitter. Alternatively, it is possible to continuously let the receiver in the listening mode even when the emitter generates a pulse to avoid any misdetection of a non-visible vehicle which would be emitting synchronously with the listening vehicle.

During the second step S2, the receiver in the listening mode detects whether an incoming coming from a non-visible vehicle has been received or not. If no proximity signal has been received (alternative N), the method loops on the first step. If a proximity signal has been received (alternative Y), the method loops also on the first step and processes the received signal during a third step.

During the third step S3, a processor either of the proximity sensor or of an advanced driver-assistance system processes the received proximity signal to detect any non-visible vehicle. Such detection may be performed for example by using the Doppler effect and/or amplitude modulation of the received signals. In this manner, the processor will be able to determine the distance and speed of the non-visible vehicle.

During a fourth step S4, whenever a non-visible vehicle has been detected, a warning message will inform the driver and/or the advanced driver-assistance.

According to an example embodiment, each vehicle is further equipped with at least one light sensor, such as a Lidar or a camera. During a step $S_A$ running in parallel of the screening step, the light sensor is detecting visible vehicles in the vehicle's environment. During a step SB, the detected vehicles by the proximity sensor during step S3 are compared with the detected vehicles by the light sensor during step $S_A$. During step $S_C$, non-visible vehicles are determined as the vehicle which were not detected by the light sensor but only detected by the proximity sensor. The results of step $S_C$ are then used to perform the step S4.

Figure 3:
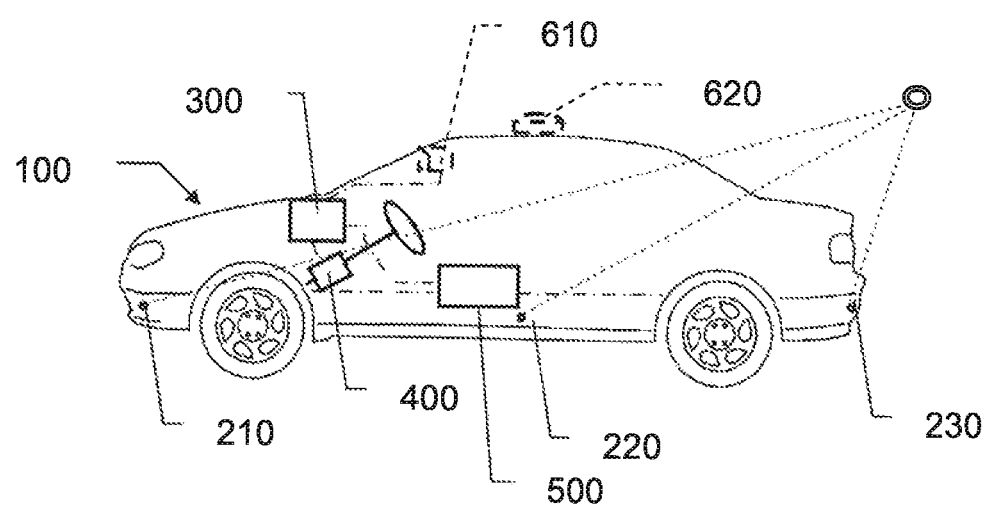
FIG. 3 represents a vehicle including a plurality of sensors useful in an example embodiment.

FIG. 3 represents a vehicle 100 equipped with a plurality of ultrasonic sensors 210, 220 and 230. Preferably the sensors are (existing) parking sensors 210 and 230 arranged on the front and rear of the vehicle. More preferably, it also comprises at least one ultrasonic sensor 220 on the side of the vehicle. Each sensor comprises an emitter and a receiver.

The vehicle 100 also comprises a processing unit, preferably included in an advanced driver-assistance system (ADAS) 300, for processing the signals received by the sensors 210-230. More specifically, the advanced driver assistance system is configured to detect non-visible vehicles in the vehicle's environment.

For that purpose, at least one of the emitters of the sensors 210-230 emits a proximity signal capable of propagating through the air along a non-linear path. At least one of the receivers of the sensors 210-230 screens any incoming proximity signal from a non-visible vehicle in its environment. Then, the ADAS processes the received proximity signal to detect the non-visible vehicle. When a non-visible vehicle is detected, a warning unit warns the driver and/or the ADAS of the presence of the detected non-visible vehicle.

The ADAS 300 is connected with a steering unit 400 arranged to steer the vehicle, and a movement control unit 500 comprising a power unit, arranged to maintain or increase a vehicle speed and a braking unit arranged to stop the vehicle or to decrease the vehicle speed. Depending on the evaluation of the risk of collision based on the warning message, the ADAS could assist the driver by adequately controlling the vehicle speed and/or direction.

According to a preferred embodiment, the vehicle 100 is also equipped with light sensors such as one or several cameras 610 to take a video or a continuous series of pictures when the vehicle is driven, or as an alternative or in addition to the cameras, a 360° scanning unit 620, or a laser light scanning unit (LIDAR) for example. These light sensors may be used to carry out the steps $S_A$ to $S_C$ described in relation with FIG. 2.

It will be understood that various modifications and/or improvements evident to those skilled in the art can be brought to the different embodiments described in the present description without departing from the scope of the present disclosure defined by the accompanying claims.

The invention claimed is:

1. A detection system, comprising:
   a light-based sensor that emits a first type of signal or radiation;
   a detector that detects a second type of signal or radiation that is distinct from the first type of signal or radiation; and
   a processor that is configured to
   determine when the detector receives the second type of signal or radiation from an object during a period when the detector is not emitting the second type of signal or radiation,
   determine whether the light-based sensor detects the object,
   determine that the object is outside of a field of view of the light-based sensor when the light-based sensor does not detect the object, and
   generate an output regarding the object.

2. The detection system of claim 1, wherein the detector is an ultrasound detector.

3. The detection system of claim 1, wherein
   the detection system is supported on a first vehicle,
   the detector receives the second type of signal or radiation from a second vehicle having a second detector that emits the second type of signal or radiation, and
   the output includes an indication of that the second vehicle has been detected while the second vehicle may be outside a field of vision of a driver of the first vehicle.

4. The detection system of claim 3, wherein the detector comprises a plurality of proximity sensors arranged at a front of the first vehicle, a rear of the first vehicle, and sides of the first vehicle and wherein at least one of the proximity sensors is an ultrasonic sensor.

5. The detection system of claim 4, wherein the ultrasonic sensor is a parking sensor.

6. The detection system of claim 1, wherein the second type of signal or radiation has a non-linear wave front.

7. The detection system of claim 1, wherein
   the received second type of signal or radiation comprises a plurality of pulses,
   movement of the object relative to the detector changes a rate that the pulses are received by the detector, and
   the processor is configured to determine whether the object is approaching the detector based on the rate.

8. A detection method using a light-based sensor that emits a first type of signal or radiation and a detector that detects a second type of signal or radiation that is distinct from the first type of signal or radiation, the method comprising:
   determining when the detector receives the second type of signal or radiation from an object during a period when the detector is not emitting the second type of signal or radiation,
   determining whether the light-based sensor detects the object,
   determining that the object is outside of a field of view of the light-based sensor when the light-based sensor does not detect the object, and
   generating an output regarding the object.

9. The method of claim 8, wherein the detector is an ultrasound detector.

10. The method of claim 8, wherein
    the light-based sensor and the detector are supported on a first vehicle,
    the detector receives the second type of signal or radiation from a second vehicle having a second detector that emits the second type of signal or radiation, and
    the output includes an indication of that the second vehicle has been detected while the second vehicle may be outside a field of vision of a driver of the first vehicle.

11. The method of claim 9, wherein the detector comprises a plurality of proximity sensors arranged at a front of the first vehicle, a rear of the first vehicle, and sides of the first vehicle and wherein at least one of the proximity sensors is an ultrasonic sensor.

12. The method of claim 11, wherein the ultrasonic sensor is a parking sensor.

13. The method of claim 8, wherein the second type of signal or radiation has a non-linear wave front.

14. The method of claim 8, wherein
    the second type of signal or radiation comprises a plurality of pulses,
    movement of the object relative to the detector changes a rate that the pulses are received by the detector, and
    the method comprises determining whether the object is approaching the detector based on the rate.

* * * * *